Dec. 11, 1956     J. SULGER     2,773,400
BEARING STRUCTURE
Filed May 8, 1953     2 Sheets-Sheet 1
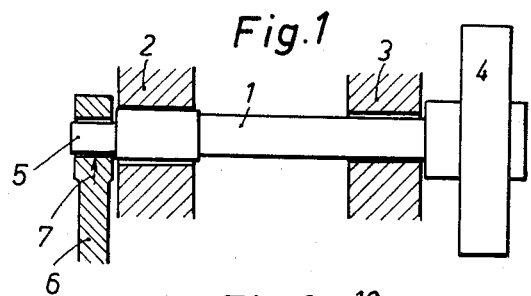
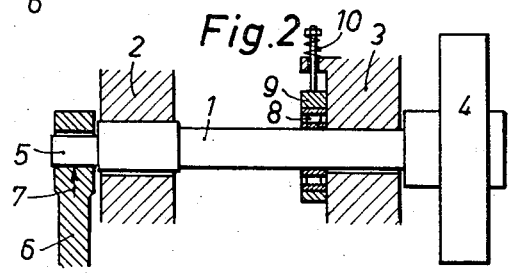
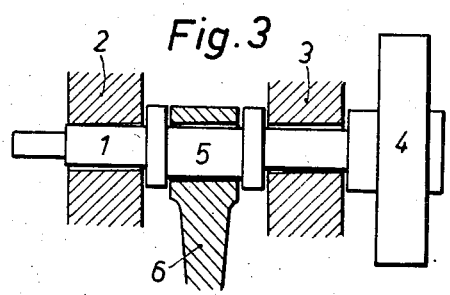
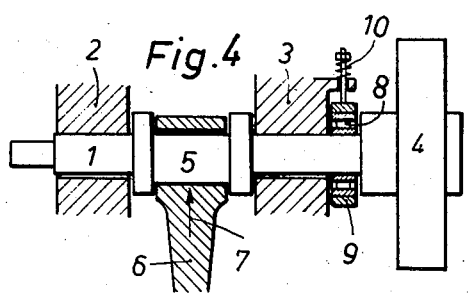
Inventor
Jakob Sulger
By
Young, Emery & Thompson
Attys.

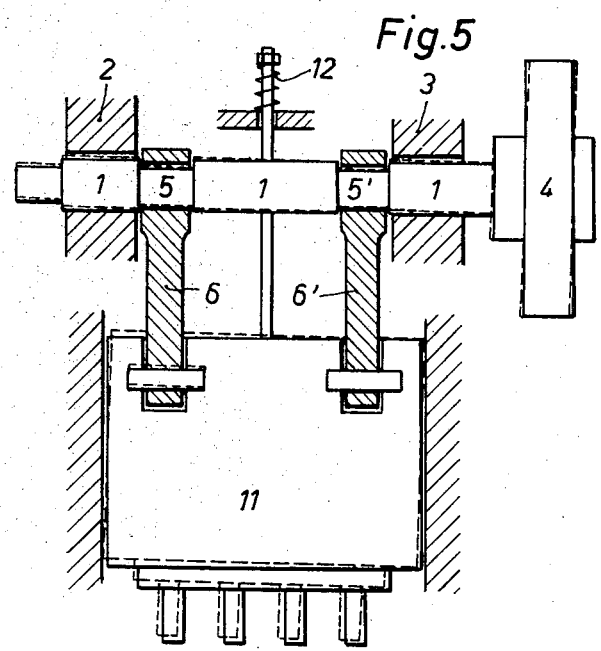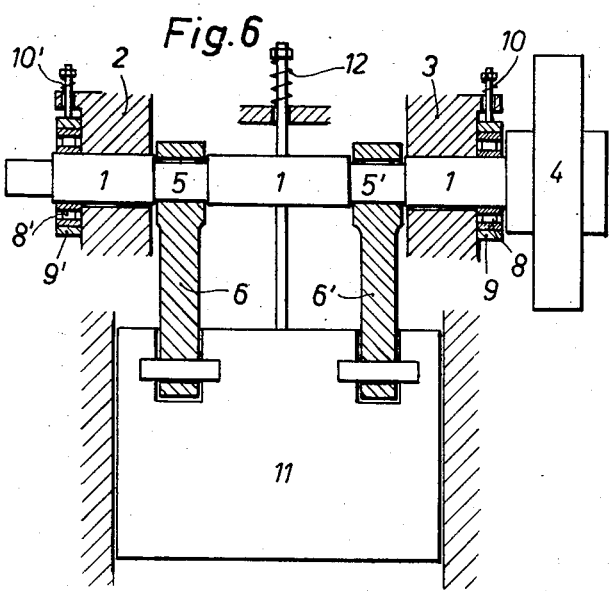

United States Patent Office 2,773,400
Patented Dec. 11, 1956

2,773,400

BEARING STRUCTURE

Jakob Sulger, Goppingen, Germany, assignor to L. Schuler A. G., Goppingen, Germany Application May 8, 1953, Serial No. 353,784

Claims priority, application Germany May 9, 1952

2 Claims. (Cl. 74—595)

This invention relates to bearing structures for the drive shafts of machine tools subject to working pressures acting transversely to the shaft, for example, the eccentric shafts of power presses.

Such shafts under the action of the unilateral transverse forces to which they are exposed, periodically assume an oblique position in their bearings owing to the working clearances necessarily provided therein, and in some cases, it is first canted and then drops back by gravity into a position of normal support in its two spaced bearings, and in other cases it is first canted at one end from the position of support in its bearings, then raised at the other end so that it bears against the upper surfaces of both bearings, and then drops back into contact with the lower surfaces of said bearings. When the shaft is connected to power transmitting means such as connecting rods, tool carrying rams, etc., in such a manner that said connected parts must participate in the movements of the shaft, such means, for example the ram, will also be canted, possibly with elastic deformation of the connecting parts such as connecting rods. Clearance in the bearings and guides cannot be dispensed with as it is necessary for the free running of the moving parts and the provision of adequate lubrication. The resulting canting of the tools mounted on the ram is particularly undesirable in cutting presses because it makes it practically impossible to use tools with a cutting edge of hard metal, which is too brittle to withstand the stresses resulting from misaligned presentation of such tools to the matrices in power presses.

The present invention overcomes these disadvantages by providing at least one movable auxiliary bearing for the shaft, and energy storing means such as a spring acting on said auxiliary bearing in the direction of the transverse working pressure acting on the shaft, to urge said shaft into journal contact with its fixed supporting bearings even when the working pressure is off. The energy storing or spring means is of sufficient strength to determine the position of the shaft in opposition to the weight thereof and the weight of the parts connected to it. The energy storage means is adjusted to exert such a force, when the machine is at rest.

Preferably the auxiliary bearing for counter-acting the effect of bearing clearance is a roller bearing and the supporting bearings of the shaft are journal bearings. Roller bearings have the advantage for the present purpose that they are much narrower than journal bearings and when used alongside journal bearings, heat can be kept down which is important in high speed machines. The work or cutting operation of an eccentric press takes place within a turn through 10 to 20 degrees of the eccentric shaft and the journal bearings are under this load only for this fraction of each rotation, whereas during the remaining part of each rotation the roller bearing takes the weight of the shaft and its connected parts.

In the case of high working pressures friction or journal bearings are preferable for the main or supporting bearings, but roller bearings are adequate for the requirement of compensating for the weight of the shaft and its connected parts. The compensation for clearance can be achieved also by using spring-urged movable journal bearings and stationary journal bearings, or spring-urged movable roller bearings and fixed roller bearings, or spring-urged movable journal bearings and fixed roller bearings.

The drawings illustrate three examples of the bearing structures according to the invention. In these drawings:

Figure 1 is a sectional elevation of a known bearing structure,

Fig. 2 is a sectional elevation of a structure with the invention applied thereto, Fig. 3 is a sectional elevation of a second known bearing structure, Fig. 4 is a sectional elevation of the structure of Fig. 3 with the invention applied thereto, Fig. 5 is a sectional elevation of a third known bearing structure, and Fig. 6 is a sectional elevation of Fig. 5 with the invention applied thereto.

In the known example shown in Figure 1 an eccentric shaft 1 of an eccentric press is supported in bearings 2 and 3 in the press frame. Outside the bearings a flywheel 4 is carried on the shaft 1, and the eccentric pin 5 at the other end of the shaft is journalled to a connecting rod 6. When the press is exerting the working pressure, the connecting rod 6 imposes an upward force, indicated by the arrow 7, on the pin 5 on the shaft 1, as a result of which the shaft 1, is in contact with the bearing 2 next the connecting rod, at its forward upper edge, while the shaft, in the other bearing 3 next the flywheel, owing to the weight of the latter is in contact with said bearing at its lower outer edge. Therefore, in the bearings 2 and 3, and in the connecting rod bearing, the clearances will determine an obliquity of the shaft 1 and undesirable edge pressures at the above indicated places. When the sheet metal being worked in the press is cut through under the working pressure, this abruptly drops to zero and the shaft 1 by its own weight and that of the attached connecting rod 6 and flywheel 4, falls back into its normal position in the bearings 2 and 3. The press tool or punch thus drops into the associated die or matrix by a certain amount determined by the clearance in the joint, not shown, between the tool and the connecting rod, the clearance between the connecting rod and the eccentric pin, and the clearance in the bearings 2, 3. This drop is very detrimental to the machine.

In the example shown in Fig. 2 the arrangement of Figure 1 is modified by arranging between the stationary bearings 2 and 3, on the eccentric shaft 1, a roller bearing 8 in a housing 9 guided in the press frame transversely to said shaft, and acted upon by an energy storing means, shown as a spring 10. This spring is of such strength that, as shown in Fig. 2 the shaft 1 and the parts attached thereto are held in contact with the tops of the bearings, even when the working pressure is off or inoperative. Preferably the energy storing means is sufficiently strong to absorb also the forces created by the retardation of the moving masses, to prevent any dropping of the tool.

In the example shown in Fig. 3 the connecting rod 6 engages the eccentric pin 5 of the shaft 1 between the bearings 2 and 3. When the tool strikes the workpiece the eccentric shaft 1 as shown in Fig. 3, is first raised at one end until it bears against the upper left hand area of the bearing 2. With increasing work pressure, contrary to the example of Figure 1, the other end of the shaft with the flywheel 4 is raised so that the shaft finally bears against the top of the bearing 3. When the tool penetrates the workpiece the shaft 1 first drops at the flywheel end, together with the flywheel, and then drops at the other end in the bearing 2, by the amount of bearing clearance. The periodic localized area pressures and the dropping of the tool are just as detrimental as in the structure according to Figure 1.

According to Fig. 2 the clearance in the direction of the working pressure is compensated by means of a movable roller bearing arranged between the stationary bearings 2 and 3, but in Fig. 4 a similar roller bearing 8 in a housing 9, acted upon by a spring 10, is arranged outside the bearing 3, that is, between the bearing 3 and the flywheel 4. In this example also, as shown in Fig. 4, the shaft 1 is in continuous contact with the top of each bearing 2 and 3.

In the example shown in Fig. 5 the shaft 1 has two eccentric pins 5 and 5' each carrying a connecting rod 6 and 6' and supported in bearings 2, 3 outside the connecting rods, as is usual in presses having two side columns for mounting a plurality of tools for sequence operation. The weight of the ram 11 is compensated generally by springs 12 or air cushions. In Fig. 5 is shown in full lines the position of the tool ram and the eccentric shaft, parallel to the press table (not shown), and in broken lines the position of said parts after the tool strikes the workpiece. The shaft 1, as in the examples of Figs. 1 and 3, first assumes an oblique position. In the use of tools operating in sequence, the unilateral raising of the shaft at the beginning of an entering strip of work material is enhanced because first only one, then two, and finally only after several down strokes, all parts of the tool will work simultaneously. Since both connecting rods 6 and 6' determine the position of the ram 11 relatively to the shaft 1, the ram as well as the shaft assume oblique positions, and become canted in their guides. The tools attached to the ram therefore also assume an oblique position so that their cutting edges become laterally misaligned with the openings in the matrices. As the pressure increases the shaft, as described with relation to Fig. 3, is also raised in the bearing 3 next the flywheel until finally it presses against the tops of both bearings 2 and 3. The shaft, the ram with its tool mountings and the table are again parallel, and the tools which were transiently laterally misaligned, arrive, loaded with the cutting pressures in their correct position with respect to the matrix. After penetration of the workpiece the parts return to the oblique position because the shaft at the flywheel end first drops in the bearing 3 by the amount of bearing clearance, whereby the tools encounter the openings in the matrices with unilateral misalignment.

In the example of Fig. 6 this disadvantage is avoided, as in the case of Fig. 4, by arranging roller bearings 8 and 8' in housings 9 and 9', outside the two stationary bearings, which housings are under the action of springs 10 and 10' so that the shaft is always in contact with the top surfaces of the bearings 2 and 3 and the connecting rods 6 and 6', the ram 11 with its tool carrying face, remain always parallel to the table of the press whereby the tools are retained in exact alignment with the matrices. The use of tools with hard metal cutting edges thereby becomes possible.

I claim as my invention:

1. Bearing structure for the drive shaft of machine tools subject to working pressure in a direction transverse to the shaft, comprising a drive shaft, a connecting rod journalled on the shaft, a pair of stationary bearings in which said shaft is supported at spaced locations, at least one movable auxiliary roller bearing connected to said shaft, and energy storing means connected to and acting on said auxiliary roller bearing in the same direction as the working pressure to urge said shaft into journal contact in said stationary bearings even when the working pressure is not present.

2. Bearing structure for the drive shaft of machine tools subject to working pressure in a direction transverse to the shaft, comprising a drive shaft, a connecting rod journalled on the shaft, a pair of stationary bearings in which said shaft is supported at spaced locations, at least one movable auxiliary roller bearing connected to said shaft, and energy storing means connected to and acting on said auxiliary roller bearing in the same direction as the working pressure to urge said shaft into journal contact in said stationary bearings even when the working pressure is not present, said means being provided opposite the connecting rod relative to the shaft.

References Cited in the file of this patent

UNITED STATES PATENTS

| | | |
|---|---|---|
| 1,162,125 | Bassett | Nov. 30, 1915 |
| 1,362,754 | Sperry | Dec. 21, 1920 |
| 2,703,735 | Falk | Mar. 8, 1955 |